United States Patent [19]

Miyoshi et al.

[11] 4,443,260

[45] Apr. 17, 1984

[54] METHOD FOR STRENGTHENING SOFT SOIL

[75] Inventors: Hajime Miyoshi, Koganei; Etsuo Asanagi, Kashiwa; Junsuke Iguchi; Ikuo Okabayashi, both of Yamato, all of Japan

[73] Assignee: Chiyoda Chemical Engineering & Constr., Co., Ltd., Kanagawa, Japan

[21] Appl. No.: 388,146

[22] Filed: Jun. 14, 1982

[51] Int. Cl.³ .................. C04B 7/02; C04B 7/35; E01C 7/36; C04B 11/00
[52] U.S. Cl. .................. 106/109; 106/89; 106/117; 106/900; 404/76; 405/128
[58] Field of Search .................. 404/75, 76; 405/128, 405/129; 106/900, 89, 97, 117, 109, 110

[56] References Cited

U.S. PATENT DOCUMENTS

| | | | |
|---|---|---|---|
| 4,266,980 | 5/1981 | Chudo et al. | 106/117 |
| 4,299,516 | 11/1981 | Miyoshi et al. | 106/97 |
| 4,306,910 | 12/1981 | Miyoshi et al. | 106/900 |

*Primary Examiner*—Gary P. Straub
*Attorney, Agent, or Firm*—Kenway & Jenney

[57] ABSTRACT

A high water content soft soil, for example from the sea or river bed, may be improved in strength by incorporating thereinto an additive composed of ingredient A including a mixture of 5–45% by weight of gypsum and 95–55% by weight of a water-granulated iron blast furnace slag having an particle size within the range of 100–1 μm and ingredient B including a Portland cement. The ratio by weight of ingredient A to ingredient B is within the range of 75/25–55/45. Ingredient A is incorporated into the soft soil before incorporation of ingredient B.

4 Claims, 3 Drawing Figures

METHOD FOR STRENGTHENING SOFT SOIL

BACKGROUND OF THE INVENTION

1. Field of the Invention

This invention relates to a method for improving the strength of water-saturated soft soils.

2. Description of the Prior Art

It is generally known from past experience that a water-saturated soft soil deposited on the bottom of seashore, river, lake and lagoon must be strengthened to enable passage of people or traffic vehicles or conveyance of construction machines on reclaimed soft grounds formed by dredging such water-saturated soft soil.

In U.S. Pat. No. 4,299,516 owned by Chiyoda Chemical Engineering & Construction Co., Ltd., there is disclosed a method in which such a soft soil is treated with a specific additive for improving the strength thereof by reaction between various components of the soil and the additive. More specifically, in this prior art method, the soft soil is admixed with ingredient A including gypsum and ingredient B including a mixture of a water-granulated iron blast furnace slag and a Portland cement, with a ratio by weight of ingredient A to ingredient B being in the range of 10/90 to 30/70. This prior art suggests the desirability that the total amount of ingredients A and B be 50–150 kg per cubic meter of the soft soil to be treated and that ingredient A be admixed with the soft soil before ingredient B.

While this prior art method may impart a desirable strength to the soft soil, the method encounters certain problems in operational efficiency, especially when applied to the large scale treatment of soft soil. That is, the prior art method is not quite satisfactory in ease of attaining the homogeneous mixing of ingredients A and B with the soft soil, which is essential to effectively increase the strength of the soft soil. Thus, with this method, it is necessary to continue the mixing operation for a relatively long period of time or to conduct a high load mixing operation in order to impart a practical acceptable strength to the soft soil.

SUMMARY OF THE INVENTION

It is, therefore, an object of the present invention to provide an improved method for improving the strength of a water-saturated soft soil, in which the drawback encountered in the prior art method is overcome.

Another object of the present invention is to provide a method which can increase the strength of a water-saturated soft soil economically with high efficiency.

In accomplishing the foregoing objects, there is provided in accordance with the present invention a method for improving the strength of a water-saturated soft soil, which comprises admixing the soft soil with ingredient A including a mixture of 5–45% by weight of gypsum and 95–55% by weight of a water-granulated iron blast furnace slag having a particle size within the range from 100 to 1 $\mu$m, and ingredient B including a Portland cement. The ratio by weight of ingredient A to ingredient B is within the range from 75/25 to 55/45, and the soft soil is admixed with ingredient A before admixture with ingredient B.

BRIEF DESCRIPTION OF THE DRAWINGS

Other objects, features and advantages of the present invention will become apparent from the detailed description of the invention which follows, when considered in light of the accompanying drawings, in which.

DETAILED DESCRIPTION OF THE INVENTION

Figure 1:
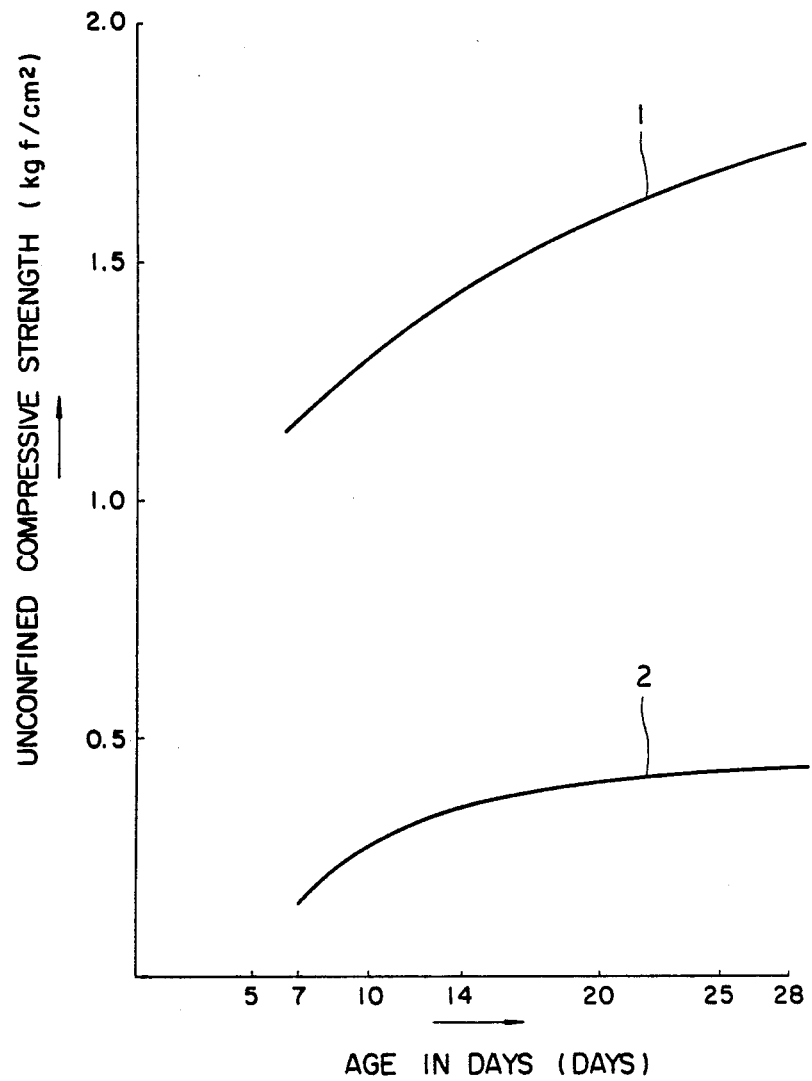
FIG. 1 is a graph showing the influence of the type of water-granulated iron blast furnace slag in ingredient A on the increase in strength of a water-saturated soft soil.

The method of the present invention includes admixing a water-saturated soft soil with ingredient A including a mixture of gypsum and a water-granulated iron blast furnace slag, and then with ingredient B including a Portland cement.

Any gypsum in the form of powder or granules can be used as one component of ingredient A. The term "gypsum" is used herein to mean calcium sulfate dihydrate exclusively. No limitation is set for the particle size of the gypsum. Accordingly, gypsum formed as by-product in a process for the desulfurization of flue gas can advantageously be used as such in the present invention.

The water-granulated iron blast furnace slag used as the other component of ingredient A is prepared from a slag by-product of an iron blast furnace by rapidly cooling the slag with water to form sand-like granules of the slag having a particle size of 1–5 mm, and then finely dividing the granules to a particle diameter of 100–1 $\mu$m (referred to hereinafter as water-granulated iron blast furnace slag). The composition of water-granulated iron blast furnace slags varies according to the composition of iron ores used or on the operation conditions of the blast furnace but is generally as follows:

$SiO_2$ 30–35%, $Al_2O_3$ 13–18%, $CaO$ 38–45%, $Fe_2O_3$ 0.5–1.0%, $MgO$ 3.6%, $S$ 0.5–1.0%, $MnO$ 0.5–1.5%, and $TiO_2$ 0.5–1.0%

It is essential that the water-granulated iron blast furnace slag should have a latent hydraulic property (i.e. it should exhibit hydraulicity upon contact with alkalis such as calcium hydroxide and sodium hydroxide or certain sulfates such as sodium sulfate and potassium sulfate) so that the slag may function as reactant in the method of this invention. Therefore, it is important that a slag by-product from an iron blast furnace should be rapidly cooled so as to prevent its crystallization and to form a non-crystalline (glassy) slag without its energy of crystallization being lost, and that the non-crystalline slag should be finely ground. Thus, since furnace slag granules obtained by slowly cooling the slag by-product are in the form of crystals and have no hydraulic property, they are not suitable for use as a component of ingredient A even if they are finely pulverized. The use of granules of slag having a particle size of 1–5 mm as a component of ingredient A is also undesirable because of their low reactivity which is attributable to their small specific surface area. When finely pulverized water-granulated iron blast furnace slag having a particle size of 100 to 1 $\mu$m (i.e. a particle size almost the same as or less than that of a Portland cement) is used in the present invention, the treated soft soil is typically 3–5 times as high in strength as soft soil treated with an additive which includes ordinary coarse water-granulated iron blast furnace slag having a particle size of 1-5 mm.

If the slag and gypsum are added to the soft soil prior to being mixed with each other, then it becomes very difficult to homogeneously admix the soft soil with both components. Thus, it is important that the water-granulated iron blast furnace slag should be mixed homogeneously with the gypsum prior to being added to the soft to be treated, in order to promote its reactivity.

Ingredient A may be prepared either by mixing a water-granulated iron blast furnace slag with gypsum in a predetermined mixing ratio and pulverizing the mixture or by homogeneously mixing a previously pulverized water-granulated iron blast furnace slag with powdery or non-pulverized granular gypsum. By-product gypsum recovered in a separating zone, such as a centrifuge device, of a system for the desulfurization of flue gas generally contains about 10% by weight of free water. Such gypsum can be mixed as such with a dried water-granulated iron blast furnace slag for the formation of ingredient A.

The proportion of the gypsum in ingredient A should be maintained within the range of 5 to 45% by weight (the balance being essentially the slag). When the portion of the gypsum in ingredient A is below 5% by weight, the ettringite-forming reaction between the water-saturated soft soil and ingredients A and B cannot proceed to a sufficient extent to produce the desired soil-strengthening effect. A proportion of the gypsum of above 45% by weight, namely a proportion of the slag of below 55%, is also disadvantageous because, on the one hand, a greater amount of the gypsum is incorporated into the soil than that required for the ettringth-forming reaction and, on the other hand, the strength-improving effect on the soil is reduced due to the lack of the slag.

In the method of this invention the water-saturated soft soil treated with ingredient A is then admixed with ingredient B comprising a Portland cement. An Ordinary Portland cement satisfying the specifications defined in JIS R-5210 for "Portland cements" is suitable for use as the Portland cement in ingredient B. According to the nature of the water-saturated soft soil and the treatment conditions, the Ordinary Portland cement may be used alone or as a mixture with a moderate heat Portland cement, a high early strength Portland cement and/or an ultrahigh early strength Portland cement.

Both ingredients A and B can be used either in a powdery or slurried form in the method of this invention.

It is important that the ratio by weight of ingredient A relative to ingredient B (A/B ratio) should be maintained within the range from 75/25 to 55/45. The soil strengthening effect is low when the A/B ratio is outside the above range. That is, an A/B ratio greater than 75/25 is insufficient to provide necessary amounts of inducing substances for soil-strengthening reactions. If the A/B ratio is less than 55/45, then the optimum balance in respective components is lost, so that a poor improvement in strength results. In addition, if the relative proportion of ingredient B exceeds 45% by weight, a significant amount of heat will be evolved during the strength-improving treatment, thus resulting in the formation of internal strain in the treated soft soil. Further, the use of an excessive amount of ingredient B results in a higher content of calcium hydroxide in the treated soft soil. This is undesirable because the treated soft soil is then strongly alkaline and is susceptible to erosion by sewer or sea water. Moreover, the use of an excessive amount of ingredient B is disadvantageous from economic point of view.

Preferably, the ratio by weight of ingredient A to ingredient B is in the range from 70/30 to 60/40. In this case, very good results are obtained with ingredient A composed of 15-35% by weight of gypsum and 85-65% by weight of a finely divided water-granulted iron blast furnace slag.

In general, the strength required for treated soft soil in the field is about 0.5-2 kgf/cm$^2$ in terms of unconfined compressive strength. In general, these levels can be achieved according to the present invention by admixing the soft soil with from about 50 to 150 kg of additive (i.e. total amount of ingredients A and B) per cubic meter of the soft soil, with amounts in the upper end of this range being used particularly when the soft soil contains a large amount of organic materials, while amounts within the range of 50-100 kg per cubic meter of the soft soil are usually sufficient when the soil has a relatively low organic content.

The method of the present invention is applicable to soft soils having a wide range of water contents, for example a water content of 50-200% even, and is applicable to highly water-saturated soft soils having water contents as high as 500-1000%. When the method of this invention is applied to a highly water-saturated soft soil, excess water will be separated from the treated soft soil onto the surface thereof upon breeding.

In practicing the invention, the water-saturated soft soil to be treated is first admixed with ingredient A (first treatment step) so that the soft soil may be made reactive with ingredient B to be added in a subsequent second treatment step. By virtue of the non-stickiness of the water-granulated iron blast furnace slag of ingredient A, the addition of ingredient A can improve the workability of the soft soil to be treated. Such an improvement in soil workability cannot be seen in the case of the previously described prior art method in which gypsum is added by itself to the soft soil in the first treatment step. In addition, since the amount of ingredient A added in the first treatment step relative to the soft soil is much larger than that in the prior art method, the mixing efficiency of the first treatment step of this invention is higher as compared with the prior art method. Furthermore, no aggregation of the soft soil results by the incorporation of ingredient A. All the above features of this invention make it possible to homogeneously mixing the soft soil with ingredient A easily and within a short mixing operational time by means of any mixing machine such as a rotating-blade type mixing device.

The water-saturated soft soil which has been subjected to the first treatment step is then admixed with ingredient B (second treatment step). Since the soft soil has been improved in its workability, the second treatment step may also be carried out without encountering any difficulties. By adding ingredient B to the pre-formed mixture of soft soil and ingredient A, various reactions for improving the strength of the soft soil take place, including a reaction between ingredients A and B themselves, the hydration of ingredient B and a reaction between the soft soil and ingredients A and B. The reactions for improving the strength of the soft soil proceed with good efficiency since the soft soil which has been mixed with ingredient A is converted into a preferred reaction medium for ingredient B. Especially, since the first treatment step can provide the water-saturated soft soil with a suitable amount of gypsum dissolved in its water phase (solubility of gypsum is about 0.2 g in terms of $CaSO_4$ per 100 g of water), a reaction resulting in the formation of ettringite ($3CaO \cdot Al_2O_3 \cdot 3CaSO_4 \cdot 32H_2O$) can take place easily between the soft soil and ingredients A and B in the second step. As the water-saturated soft soil has been homogeneously admixed with ingredient A in the first step, the reaction for the formation of ettringite takes place smoothly throughout the treated soft soil upon addition of ingredient B, whereby rapid improvement in strength of the soft soil is attained.

As already noted, it is essential that the soft soil be admixed first with ingredient A and then subsequently with ingredient B. Admixing the water-saturated soft soil first with ingredient B and then with ingredient A is extremely disadvantageous because the resulting mixture is difficult to work and also only a poor improvement in strength is obtained. More specifically, when the soft soil is admixed first with ingredient B, the $Ca^{2+}$ and $OH^-$ of the cement can adversely affect the viscosity, gel strength and pH of the soft soil to the extent that the homogeneous mixing of the soft soil with ingredient B is inhibited. This also inhibits the homogeneous mixing of ingredient A so that the reactions for improving the strength of the soil cannot proceed satisfactorily. In the method of this invention, the order of addition, the relative proportion and the particle sizes of ingredients A and B are specified so that workability of the soft soil is improved and chemical properties of respective components of ingredients A and B may be effectively utilized for improving the strength of the soft soil.

In the present invention it is particularly desirable that the water-granulated iron blast furnace slag used as one component of ingredient A should be finely pulverized to a particle size within the range from 100–1 μm so that a hydraulic reaction may be effectively initiated and may continuously proceed when the slag is brought into contact with a reaction stimulating agent, and should be homogeneously mixed, along with the gypsum, with the soil to be treated in the first treatment stage. When, therefore, ingredient B is added to the soil containing ingredient A, the water-granulated iron blast furnace slag is readily activated by slaked lime, formed by the hydration reaction of the Portland cement, thereby to promote the ettringite-forming reaction and thus accelerate the soil-strengthening effect. More specifically, whilst water-granulated iron blast furnace slag itself shows no hydraulic property, unlike cement, it begins to exhibit such property when brought into contact with an activating agent such a slaked lime. Thus, in the preferred method of this invention wherein the water-granulated iron blast furnace slag is finely pulverized to become reactive and is previously mixed homogeneously with the water-saturated soft soil so as to be activated by slaked lime formed by the hydration of cement, the water-granulated iron blast furnace slag shows the same hydraulic property as shown by the cement. In the method of this invention, the strength of the treated soft soil is also believed to be improved by a Pozzolan reaction between calcium ion and silicate ion in addition to the reaction for the formation of ettringite. As the water-granulated iron blast furnace slag used in the present invention is in a finely pulverized form, it serves as a reactant also for this Pozzolan reaction.

Whilst the addition of ingredients A and B in accordance with this invention effects deodorization of the soft soil being treated to a certain extent, it is preferred when treating a soft soil with a strongly unpleasant odor to incorporate therein a water-soluble, organic or inorganic ferrous salt in an amount effective to deodorize the soil, as described in U.S. Pat. No. 4,306,910, the disclosure of which is hereby incorporated by reference.

The method of this invention is advantageously applied not only for improving the strength of reclaimed soft grounds but also for improving the nature of soft soil or sludge deposited on e.g. sea and river beds.

By employing water-granulated iron blast furnace slag in admixture with gypsum, a number of advantages may be obtained in comparison with the method disclosed in U.S. Pat. No. 4,299,516 in which the slag alone is used in admixture with a Portland cement. In the first place, with the method of this invention, the soft soil being treated is significantly improved in its workability as mentioned previously, so that homogeneous mixing of the soil with ingredients A and B may be easily attained within a short period of operation time, whereby operation efficiency is noticeably improved as compared with the prior art method. This effect becomes prominent in the case of large scale treatment of soft soil. The method according to the present invention has an additional merit in that the mixture of the slag and gypsum may be prepared, stored and transported in a moistened condition. In contrast, with the prior art method, the mixture of the slag and cement should be protected from moisture since otherwise hardening of the cement and slag occurs before being admixed with the soft soil to be treated and, therefore special care should be taken during the preparation and storage of the mixture of the cement and slag. The use of a moistened mixture of the gypsum and slag is also advantageous because no problem of dust formation will arise in scattering the mixture over the soft soil to be treated.

The following examples will further illustrate the present invention. In Examples 1–6, a homogeneous mixture of (X) powdery gypsum (average particle diameter: 53 μm, water content: 9%, composition: CaO 31.2% and $SO_3$ 44.1%) produced as by-product in the desulfurization treatment of waste gas and (Y) a commercially available water-granulated iron blast furnace slag (specific surface area: 3600–4000 cm²/g measured according to Blaine's air permeability method (i.e. average particle diameter of about 4 μm), composition: $SiO_2$ 32–35%, $Al_2O_3$ 15–16%, CaO 41–44%, MgO 4–6%, $Fe_2O_3$ 0.5–1.2% and S 0.8–1.0%, a vitreous substance free from crystalline substances as determined by X-ray diffraction) was used as ingredient A, and Ordinary Portland cement (specific surface area: 3300 cm²/g measured according to Blaine's air permeability method) was used as ingredient B.

EXAMPLE 1

A muddy marine deposit having a water content of 260% (particle size distribution: 0–2 μm 14%, 2–5 μm 42%, 5–10 μm 19% and 10–20 μm 25%; an average particle diameter: 7 μm) and a density of 1.21 g/cm³ at a water content of 260% was treated in accordance with the method of this invention. Thus, to 1 m³ of the soft soil was added 43.7 kg of the ingredient A (X/Y=30/70) and the mixture was homogeneously mixed in a kneader. To the mixture was then added 23.5 kg of ingredient B and the whole was thoroughly mixed in the kneader. A sample of the mixture was then injected into a cylindrical mold of 50 mm inside diameter and 100 mm height, maintained at 20°±1° C. constant temperature in a humidity box for a given period of time to effect curing of the sample, and then released from the mold for the measurement of its unconfined compressive strength.

For the purpose of comparison, a similar test was performed except that a water-saturated iron blast furnace slag in the form of coarse granules (Y') was used.

The result of these tests is shown as a graph in FIG. 1 of the accompanying drawings. The particle size distribution of the water-granulated iron blast furnace slags Y and Y' used is shown in Table 1.

TABLE 1

| Sort of the water-granulated iron blast furnace slags | Passing weight (%) Size of sieves (mm) | | | | | | | | |
|---|---|---|---|---|---|---|---|---|---|
| | 0.01 | 0.03 | 0.088 | 0.15 | 0.3 | 0.6 | 1.2 | 2.5 | 5 |
| Y | 40.5 | 84.0 | 100 | | | | | | |
| Y' | | | | 5.0 | 17.5 | 40.0 | 60.5 | 87.0 | 99.5 |

In the graph of FIG. 1, the abscissa stands for the age in days after the treatment and the ordinate for the unconfined compressive strength of the treated soft soil (kgf/cm$^2$). The line 1 stands for the result of the test in accordance with the present invention using furnace slag Y while the line 2 for the result of the Comparative run using furnace slag Y'.

EXAMPLE 2

A test was performed in the same manner as described in Example 1 except that the ingredients A and B were used in amounts of 40.3 kg and 26.9 kg, respectively, and that the X/Y ratios of the ingredient A was varied in the range from 4/96 to 50/50. The results of the test obtained for the treated soft soil 2 weeks after the treatment are shown in FIG. 2 of the accompanying drawings.

Figure 2:
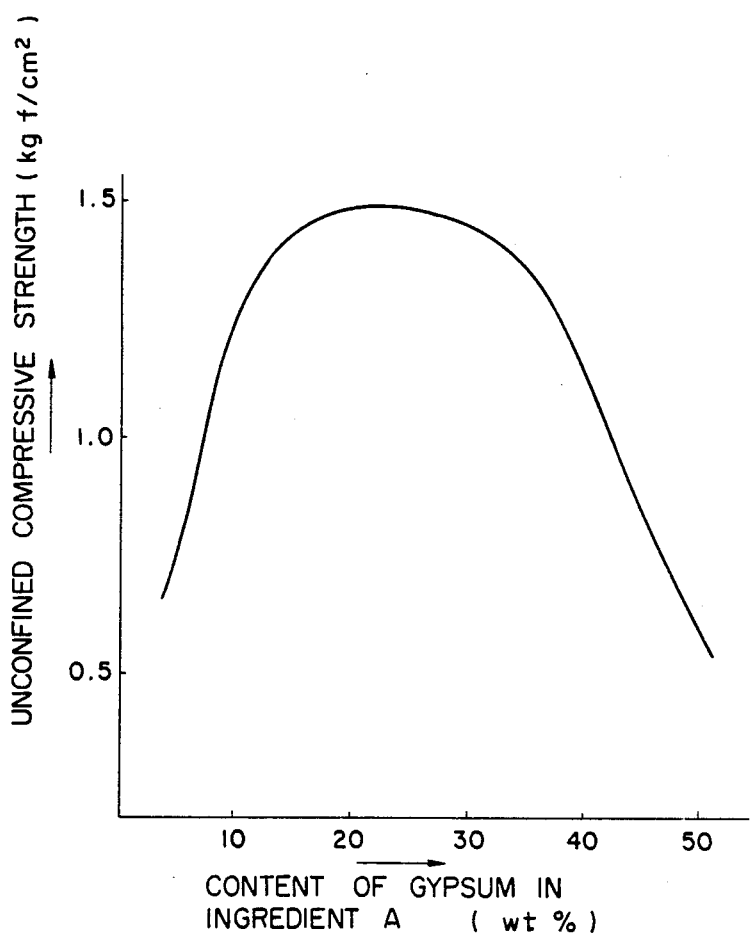
FIG. 2 is a graph showing the influence of the content of gypsum in ingredient A on the increase in strength of a water-saturated soft soil.

In the graph of FIG. 2, the abscissa stands for the amount of the gypsum in the ingredient A in terms of % by weight while the ordinate for unconfined compressive strength of the treated soft soil.

EXAMPLE 3

A test was performed in the same manner as described in Example 1 except that the proportion of the ingredient A to the ingredient B was varied. The results of the test are shown in FIG. 3 of the accompanying drawings.

Figure 3:
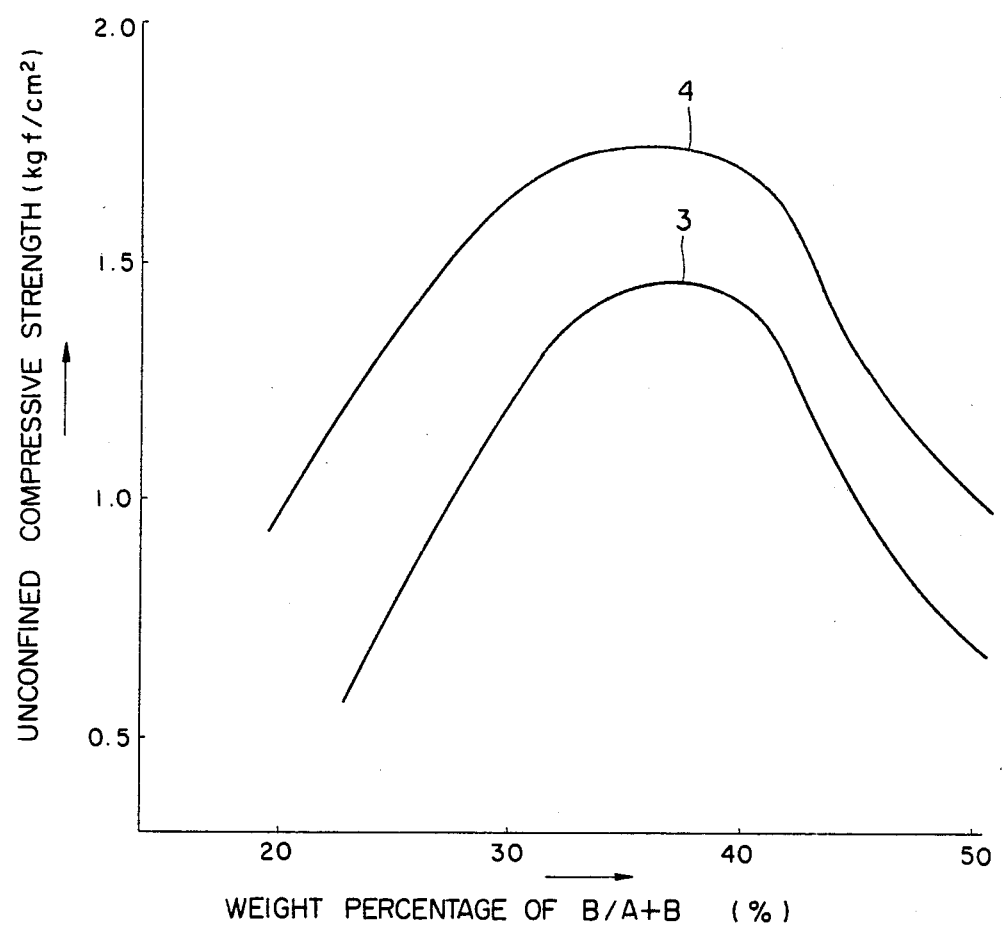
FIG. 3 is a graph showing the influence of the proportion of ingredient B to ingredients A and B on the increase in strength of the treated soft soil.

In the graph of FIG. 3, the abscissa stands for the percent ratio by weight of ingredient B to sum of ingredients A and B (B/A+B×100) while the ordinate for the unconfined compressive strength of the treated soft soil. In this graph, curves 3 and 4 show results obtained for the treated soft soil 2 weeks and 4 weeks after the treatment, respectively.

EXAMPLE 4

A river sediment having a water content of 348.4% (particle size distribution: 0–5 μm 46%, 5–20 μm 49% and above 20 μm 5%, an average particle diameter: 5.2 μm), a density of 1.15 g/cm$^3$ at a water content of 348% a pH value of 8.0 and an ignition loss of 23.7% was treated in accordance with the method of this invention. This soft soil had unpleasant odour and the gas evolved therefrom contained 1800–2000 ppm of hydrogen sulfide. This soft soil had a total hydrogen sulfide content of 430 mg (12.6 m-mol)/kg, an insoluble sulfide content of 2386 mg (70.2 m-mol)/kg and a total organic matter content of 21.2 wt.%/kg. The total hydrogen sulfide content was determined by measuring by iodometry, the quantity of free hydrogen sulfide distilled off during steam distillation of the soft soil to be treated. The insoluble sulfide content was determined by adding concentrated sulfuric acid to the distillation residue obtained in the analysis of the total hydrogen sulfide, subjecting the mixture again to steam distillation, and analyzing the quantity of hydrogen sulfide distilled. The organic matter content was measured by a testing method using chromic acid.

To 1 m$^3$ of the odorous soft soil were added 5 l of ingredient C (an aqueous solution of ferrous sulfate having a Fe$^{++}$ concentration of 15.6 g (0.28 mol)/l, 78 kg of ingredient A (X/Y=33/67) and 52 kg of ingredient B in the order indicated in Table 2 and the mixture after each addition of respective ingredients was thoroughly mixed in a mill. The mixture was then molded in the same manner as described in Example 1 to obtain a molding. Each molding was then subjected to a series of tests to measure its unconfined compressive strength, the amount of hydrogen sulfide evolved therefrom, the degree of unpleasant odor and the pH value according to the elusion test stipulated in Notification No. 13 of the Japanese Ministry of Environment. The result of the tests is shown in Table 2.

In Table 2, C+A, indicates simultaneous addition of the ingredients C and A. The marks given with respect to evaluation of unpleasant odour have the following meanings.

TABLE 2

| Order of addition of the ingredients | | | Unconfined compressive strength (kgf/cm$^2$) Age in days | | | H$_2$S | Evaluation of unpleasant | |
|---|---|---|---|---|---|---|---|---|
| (1) | (2) | (3) | 3 | 7 | 14 | (ppm) | odor | pH |
| C | A | B | 0.30 | 0.91 | 1.10 | trace | + | 9.4 |
| C+A | B | — | 0.29 | 0.94 | 1.02 | " | + | 9.4 |
| A | B | — | 0.35 | 0.87 | 1.01 | 5 | ++ | 9.7 |

+ very weak
++ strong

EXAMPLE 5

A muddy lagoon sediment having a water content of 100%, an average density of 1.45 g/cm$^3$ at a water content of 100%, and a plastic index of 20.4 was treated in accordance with the method of this invention using a back-hoe as a mixing device. The soft soil was admixed first with the ingredient A (X/Y=⅓) in a proportion of 60 kg per 1 m$^3$ of the soft soil and then with the ingredient B in a proportion of 40 kg per 1 m$^3$ of the soft soil. This method was able to treat about 400 m$^3$ of the soft soil per day.

For the purpose of comparison, the soft soil was treated according to the method disclosed in U.S. Pat. No. 4,299,516. Thus, the soft soil was treated in the same manner as described above except that it was first admixed with a gypsum in an amount of 20 kg per 1 m³ of the soft soil and then with a 1:1 mixture of a slag and Portland cement in an amount of 80 kg per 1 m³ of the soft soil. (The gypsum, slag and cement were of the same type as used in the above method.) The treatment was conducted so that the strength of the soft soil was improved to the same degree as with the above method. As a result, the prior art method was found to treat about 300 m³ of the soft soil per day.

EXAMPLE 6

1500 kg of the ingredient A ($X/Y = \frac{1}{2}$) were scattered over the surface of a soft soil ground (the same muddy lagoon sediment as used in Example 5) in an area of 25 m²(5×5 m) and, thereafter, the soft ground was plowed out in a depth of 1 m for 20 minutes using a back-hoe for mixing. Nine samples each amounting to 1 kg were sampled from the resulting ground for examination of the degree of homogeneous mixing of the ingredient A into the soil. The examination was carried out by measuring the amount of gypsum in each sample, which in turn was determined in terms of $SO_3$ concentration. The results were as summarized in Table 3.

For the purpose of comparison, the similar test was conducted using 500 kg of gypsum in place of the ingredient A, following the above-mentioned prior art method. The results are shown in Table 3.

TABLE 3

| | Concentration of $SO_3$ (wt %) | | |
| --- | --- | --- | --- |
| | Method of the Invention (500 kg gypsum and 1000 kg slag) Mixing time | Prior Art Method (500 kg gypsum) Mixing time | |
| Sample No. | 20 min. | 20 min. | 30 min. |
| 1 | 0.634 | 0.714 | 0.601 |
| 2 | 0.591 | 0.565 | 0.725 |
| 3 | 0.542 | 0.813 | 0.588 |
| 4 | 0.685 | 0.449 | 0.630 |
| 5 | 0.551 | 0.454 | 0.542 |
| 6 | 0.704 | 0.582 | 0.682 |
| 7 | 0.623 | 0.743 | 0.495 |
| 8 | 0.615 | 0.338 | 0.628 |
| 9 | 0.587 | 0.650 | 0.612 |
| Average | 0.615 ± 0.042 | 0.590 ± 0.118 | 0.611 ± 0.053 |
| R* | 0.162 | 0.475 | 0.230 |

*Maximum value–Minimum value

From the results in Table 3, it is seen that 30 minutes of mixing according to the prior art method still fails to attain the degree of the mixing attained by 20 minutes mixing according to the method of this invention.

We claim:
1. A method for improving the strength of a water-saturated soft soil:
   premixing 5–45% by weight particulate gypsum and 55–95% by weight of a water-granulated iron blast furnace slag having a particle size of 1–100 μm to obtain a first homogeneous admixture (A) of slag particles and gypsum particles;
   then admixing said first admixture (A) with the soft soil to obtain a second homogeneous admixture; and then
   admixing (B) a Portland cement with said second admixture in an amount to provide a weight ratio of said first admixture (A) to said Portland cement (B) within the range of 75/25 to 55/45, whereby the period of time required to obtain a homogeneous mix with the soil is less than when the slag is premixed with the cement.

2. A method as claimed in claim 1, wherein ingredient (A) is composed of a mixture of 15–35% by weight of the gypsum and 85–65% by weight of the water-granulated iron blast furnace slag, the ratio by weight of ingredient (A) to ingredient (B) being within the range from 70/30 to 60/40.

3. A method as claimed in claim 1, wherein the total amount of ingredients (A) and (B) added is 50–150 kg per cubic meter of soft soil.

4. A method as claimed in claim 1, 2 or 3, wherein (C), a water-soluble ferrous salt, is also added to said soft soil, prior to the addition of ingredient (B), in an amount effective to deodorize said soil.

* * * * *